United States Patent
Bhowmick et al.

(10) Patent No.: US 9,865,061 B2
(45) Date of Patent: Jan. 9, 2018

(54) CONSTRUCTING A 3D STRUCTURE

(71) Applicant: Tata Consultancy Services Limited, Mumbai, Maharashtra (IN)

(72) Inventors: Brojeshwar Bhowmick, West Bengal (IN); Apurbaa Mallik, West Bengal (IN); Arindam Saha, West Bengal (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 0 days.

(21) Appl. No.: 14/493,959

(22) Filed: Sep. 23, 2014

(65) Prior Publication Data

US 2015/0371396 A1  Dec. 24, 2015

(30) Foreign Application Priority Data

Jun. 19, 2014  (IN) .......................... 1989/MUM/2014

(51) Int. Cl.
*G06T 7/80* (2017.01)
*G06T 7/593* (2017.01)
(Continued)

(52) U.S. Cl.
CPC ............ *G06T 7/0075* (2013.01); *G06K 9/209* (2013.01); *G06T 7/579* (2017.01); *G06T 7/593* (2017.01);
(Continued)

(58) Field of Classification Search
CPC ... G06T 7/0075; G06T 7/0018; G06T 7/0022; G06T 2207/10021; G06K 9/209; G06K 2209/40
See application file for complete search history.

(56) References Cited

U.S. PATENT DOCUMENTS 6,825,838 B2  11/2004  Smith et al.
7,187,401 B2  3/2007  Alhadefm et al.
(Continued)

OTHER PUBLICATIONS

Hu, Xiaoping, and Narendra Ahuja. "Long Image Sequence Motion Analysis Using Polynomial Motion Models." MVA. 1992.*
(Continued)

*Primary Examiner* — Bhavesh Mehta
*Assistant Examiner* — Menatoallah Youssef
(74) *Attorney, Agent, or Firm* — Merchant & Gould P.C.

(57) ABSTRACT

Disclosed is a method and system for constructing a 3D structure. The system of the present disclosure comprises an image capturing unit for capturing images of an object. The system comprises of a gyroscope, a magnetometer, and an accelerometer for determining extrinsic camera parameters, wherein the extrinsic camera parameters comprise a rotation and a translation of the images. Further the system determines an internal calibration matrix once. The system uses the extrinsic camera parameters and the internal calibration matrix for determining a fundamental matrix. The system extracts features of the images for establishing point correspondences between the images. Further, the point correspondences are filtered using the fundamental matrix for generating filtered point correspondences. The filtered point correspondences are triangulated for determining 3D points representing the 3D structure. Further, the 3D structure may be optimized for eliminating reprojection errors associated with the 3D structure.

9 Claims, 4 Drawing Sheets (51) Int. Cl.
G06K 9/20 (2006.01)
G06T 7/00 (2017.01)
G06T 7/579 (2017.01)

(52) U.S. Cl.
CPC .................. *G06T 7/80* (2017.01); *G06T 7/97* (2017.01); *G06K 2209/40* (2013.01); *G06T 2200/08* (2013.01); *G06T 2207/10021* (2013.01)

(56) References Cited

U.S. PATENT DOCUMENTS

| 7,499,586 | B2 | 3/2009 | Agarwala et al. | |
|---|---|---|---|---|
| 2002/0198656 | A1* | 12/2002 | Ford | G01C 21/165 701/472 |
| 2009/0010507 | A1* | 1/2009 | Geng | G06T 7/593 382/128 |
| 2010/0045701 | A1* | 2/2010 | Scott | G01S 5/163 345/633 |
| 2012/0306847 | A1* | 12/2012 | Lim | G06K 9/00744 345/418 |
| 2014/0037189 | A1 | 2/2014 | Ziegler et al. | |

OTHER PUBLICATIONS

Levoy, Marc, et al. "The digital Michelangelo project: 3D scanning of large statues." Proceedings of the 27th annual conference on Computer graphics and interactive techniques. ACM Press/Addison-Wesley Publishing Co., 2000.*

Martinec et al., "Robust Rotation and Translation Estimation in Multiview Reconstruction", Proceedings of Computer Vision & Pattern Recognition Conf. IEEE. Jun. 2007 pp. 1-10.

* cited by examiner

CONSTRUCTING A 3D STRUCTURE

CROSS-REFERENCE TO RELATED APPLICATIONS AND PRIORITY

This patent application claims the benefit of priority to India Patent Application No. 1989/MUM/2014, filed on Jun. 19, 2014. The aforementioned application is incorporated herein by reference in its entirety.

TECHNICAL FIELD

The present subject matter described herein, in general, relates to constructing 3D structure, and more particularly to constructing in near-real time the 3D structure of an object.

BACKGROUND

The process of constructing a 3D structure is known from several techniques. Images captured from a plurality of viewpoints/locations/angles, by a camera embedded into a user device, are required for constructing the 3D structure. A series of processes are then performed on the images for constructing the 3D structure.

However, the process of constructing the 3D structure is generally being performed on a remote server. This is because of the processing limitation of a user device. The user device includes a limited data processing support which is insufficient for constructing the 3D structure. Thus, conventionally the user device capturing images of an object transfers the images to the remote server for further processing. The step of transmitting the images over a network, to the remote server adds to the overall time required for constructing the 3D structure.

Further, the process of constructing the 3D structure requires extrinsic camera parameters related to the camera embedded into the user device. The extrinsic camera parameter are generally been extracted from the images upon processing of the images. Extracting the extrinsic camera parameters from the images consumes a lot of time and thus contributes to the overall time required for constructing the 3D structure.

Thus, there is an immense need of a system and a method that can improve the overall time required for constructing the 3D structure and can provide near real time experience for constructing the 3D structure.

SUMMARY

This summary is provided to introduce aspects related to systems and methods for constructing a 3D structure and the aspects are further described below in the detailed description. This summary is not intended to identify essential features of the claimed subject matter nor is it intended for use in determining or limiting the scope of the claimed subject matter.

In one implementation, a method for constructing a three-dimensional (3D) structure is disclosed. The method comprises, capturing, by an image capturing unit, images of an object. The method further comprises determining, by a processor, extrinsic camera parameters using a gyroscope, a magnetometer, and an accelerometer while capturing the images. The extrinsic camera parameters comprise a rotation and a translation for the images. The method further comprises computing, by the processor, an internal calibration matrix for the images. The internal calibration matrix comprises a focal length of the image capturing unit and a principle point of the image capturing unit. The method further comprises computing, by the processor, a fundamental matrix using the extrinsic camera parameters and the internal calibration matrix. The method further comprises extracting, by the processor, features of the images. The method further comprises establishing, by the processor, point correspondences amongst the images, wherein the point correspondences are established using the features of the images. The method further comprises filtering, by the processor, the point correspondences using the fundamental matrix to generate filtered point correspondences. The method further comprises generating, by the processor, a 3D structure using the filtered point correspondences, wherein the 3D structure is generated using a triangulation technique.

In one implementation, a system for constructing a 3D structure is disclosed. The system comprises an image capturing unit, a processor and a memory coupled to the processor for executing programmed instructions stored in the memory. The processor determines extrinsic camera parameters using a gyroscope, a magnetometer, and an accelerometer while capturing the images, wherein the extrinsic camera parameters comprise a rotation and a translation for the images. The processor further computes an internal calibration matrix for the images, wherein the internal calibration matrix comprises a focal length of the image capturing unit and a principle point of the image capturing unit. The processor further computes a fundamental matrix using the extrinsic camera parameters and the internal calibration matrix. The processor further extracts features of the images. The processor further establishes point correspondences amongst the images, wherein the point correspondences are established using the features of the images. The processor further filters the point correspondences using the fundamental matrix to generate filtered point correspondences. The processor further generates a 3D structure using the filtered point correspondences, wherein the 3D structure is generated using a triangulation technique.

In one implementation, a non-transitory computer readable medium embodying a program executable in a computing device for constructing a 3D structure is disclosed. The program comprises a program code for capturing images of an object. The program comprises a program code for determining extrinsic camera parameters using a gyroscope, a magnetometer, and an accelerometer of the image capturing unit while capturing the images, wherein the extrinsic camera parameters comprises a rotation and a translation for the images. The program further comprises a program code for computing an internal calibration matrix for the images, wherein the internal calibration matrix comprises a focal length of the image capturing unit and a principle point of the image capturing unit. The program further comprises a program code for computing a fundamental matrix using the extrinsic camera parameters and the internal calibration matrix. The program further comprises a program code for extracting features of the images. The program further comprises a program code for establishing point correspondences amongst the images, wherein the point correspondences are established using the features of the images. The program further comprises a program code for filtering the point correspondences using the fundamental matrix to generate filtered point correspondences. The program further comprises a program code for generating a 3D structure using the filtered point correspondences, wherein the 3D structure is generated using a triangulation technique.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
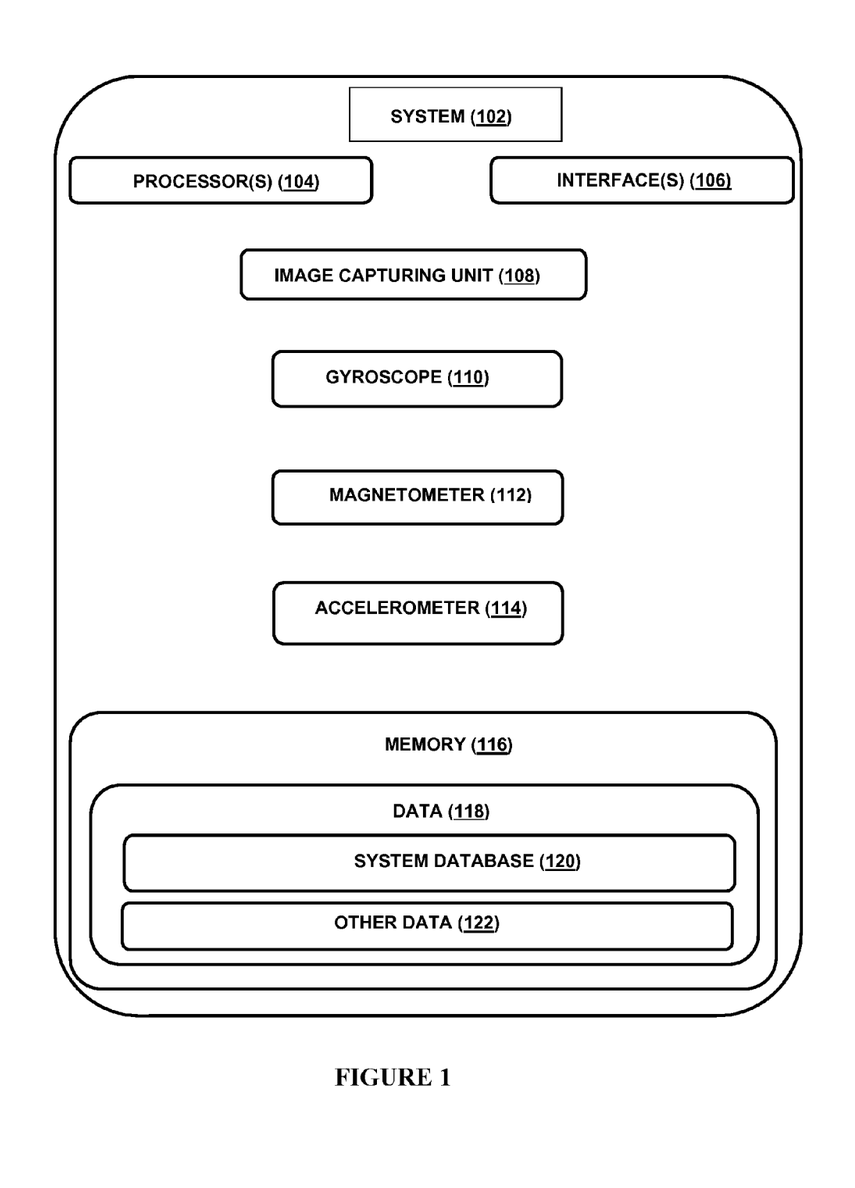
FIG. 1 illustrates a system for constructing a 3D structure, in accordance with an embodiment of the present subject matter.

Systems and methods for constructing a 3D structure are described. The present subject matter discloses a mechanism for constructing the 3D structure. The system 102 may comprise an image capturing unit 108 for capturing images of an object. The images are captured for constructing the 3D structure of the object. Further, the system 102 may also comprise a gyroscope 110, a magnetometer 112, and an accelerometer 114 for determining angular velocity, gravitational component along an axis of the image capturing unit 108 of the system 102 and acceleration respectively. The angular velocity, the gravitational component and the acceleration may be used for calculating extrinsic camera parameters. The extrinsic camera parameters may comprise a position of the images and an orientation of the images. Further, an internal calibration matrix for the images may also be calculated.

Subsequent to calculating the internal calibration matrix, the system 102 may compute a fundamental matrix using the extrinsic camera parameters and the internal calibration matrix. Further, the system 102 may extract features of the images using a suitable technique. The features of the images may be used for establishing point correspondences between the images. The point correspondences may then be filtered using the fundamental matrix for generating filtered point correspondences. The filtered point correspondences may be used for generating the 3D structure using a triangulation technique. Also, the 3D structure may be optimized for minimizing reprojection errors associated with the 3D structure.

While aspects of described system and method for constructing a 3D structure may be implemented in any number of different computing systems, environments, and/or configurations, the embodiments are described in the context of the following exemplary system.

Referring now to FIG. 1, the system 102 for constructing the 3D structure using the images of an object is shown, in accordance with an embodiment of the present subject matter. Although the present subject matter is explained considering that the system 102 is implemented on a mobile device, it may be understood that the system 102 may also be implemented in a variety of computing systems including but not limited to, a smart phone, a tablet, a notepad, a personal digital assistant, a handheld device, a laptop computer, a desktop computer, a notebook, a workstation, a mainframe computer, a server, a network server, wherein each of the devices comprise an image capturing unit/camera.

In one embodiment, the system 102 may include at least one processor 104, an input/output (I/O) interface 106, an image capturing unit 108, a gyroscope 110, a magnetometer 112, an accelerometer 114, and a memory 116. The gyroscope 110, the magnetometer 112, and the accelerometer 114 may have similar sampling rates. Further, the at least one processor 104 may be implemented as one or more microprocessors, microcomputers, microcontrollers, digital signal processors, central processing units, state machines, logic circuitries, and/or any devices that manipulate signals based on operational instructions. Among other capabilities, the at least one processor 104 is configured to fetch and execute computer-readable instructions stored in the memory 116.

The I/O interface 106 may include a variety of software and hardware interfaces, for example, a web interface, a graphical user interface, and the like. The I/O interface 106 may allow the media system 102 to interact with a user directly. Further, the I/O interface 106 may enable the system 102 to communicate with other computing devices, such as web servers and external data servers (not shown). The I/O interface 106 can facilitate multiple communications within a wide variety of networks and protocol types, including wired networks, for example, LAN, cable, etc., and wireless networks, such as WLAN, cellular, or satellite. The I/O interface 106 may include one or more ports for connecting a number of devices to one another or to a server.

The memory 116 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 116 may include data 118.

The data 118, amongst other things, serves as a repository for storing data processed, received, and generated by the at least one processor 104. The data 118 may also include a system database 120, and other data 122.

In one implementation, at first, a user may capture the images of an object by using the image capturing unit 108 of the system 102. The images may be captured from different viewpoints/locations/angles in order to collect maximum image details of the object. Further, both the system 102 and the object may be stationary while the image capturing unit 108 is capturing images of the object. The system 102, when stationary, allows the image capturing unit 108 to capture images with a proper focus. While capturing the images, the system 102 may employ the accelerometer 114 for determining a motion of the system 102 and thus enabling the image capturing unit 108 to capture the images of the object only when the system 102 is stationary.

In one embodiment, the accelerometer 114 may determine acceleration of the system 102 for determining the motion of the system 102. Further, the acceleration determined by the accelerometer 114 may include a static bias (B) before the accelerometer 114 of the system 102 is calibrated. The static bias (B) refers to a non-zero value of the acceleration while the system 102 is stationary. The static bias (B) may be calculated using the below mentioned Equation 1, where symbols have their usual meanings, $$B = \frac{1}{N}\sum_{i=0}^{N} r_i(a_i - g_i) \qquad \text{Equation 1}$$

Here, 'N' represents a total number of the images captured while the system 102 is stationary, '$r_i$' represents a rotation matrix of world with respect to the system 102 for an $i^{th}$ image, '$a_i$' represents the acceleration of the system 102 for the $i^{th}$ image, and '$g_i$' represents a gravity vector of the system 102 for the $i^{th}$ image.

In one embodiment, the accelerometer 114 may be a 3-axis accelerometer 114 determining the acceleration along an x-axis, y-axis, and a z-axis. The 3-axis accelerometer 114 of the system 102 is thus calibrated for eliminating the static bias (B) present in the acceleration determined along the x-axis, y-axis, and a z-axis, wherein the acceleration along each of the 3-axes is calculated using the above mentioned Equation 1. Thus, the accelerometer 114 upon calibration determines the motion of the system 102 along the S-axes, excluding any noises or errors.

Further, subsequent images are captured by the image capturing unit 108 when the system 102 moves by at least a threshold distance in any direction. The movement is determined to avoid capturing and storing similar image details present in the different images. Thus, capturing the subsequent image by the image capturing unit 108 while the system 102 undergoes the movement by at least a threshold distance, avoids duplication of the image details and thus capturing different images having maximum image details of the object. The threshold distance may be determined along any of the 3 axes (x-axis, y-axis, and z-axis) in a 3D space with respect to the system 102. In an example, the threshold distance may be 10 inches or may be in a range of 1 mm to several inches. The system 102 having captured a first image at a first location may capture a second image while moving to a second location, wherein the second location may be at a distance of at least 10 inches away from the first location.

For capturing the subsequent images, a movement of the system 102 may be determined using an Equation 2 and an Equation 3 as shown below, where symbols have their usual meanings, $$s = ut + \tfrac{1}{2} ft^2 \qquad \text{Equation 2}$$

$$v = u + ft \qquad \text{Equation 3}$$

Here, 's' denotes displacement of the system 102, 'f' represents the acceleration of the system 102 captured by the accelerometer 114 upon calibration, 'u' denotes an initial velocity of displacement of the system 102 between two positions/locations, and 'v' denotes a final velocity of a previous displacement of the system 102. The initial velocity (u) of the displacement of the system 102 is considered as a mean value of the final velocity (v) of the previous displacement of the system 102 and zero.

The system 102 upon determining the acceleration and movement of the system 102 may capture the subsequent images of the object. The images may be recorded in a suitable image format like Joint Photographic Experts Group (JPEG), Exchangeable image file format (Exif), Tagged Image File Format (TIFF), Raw Image Format (RAW), Graphics Interchange Format (GIF), Bitmap format (BMP), and Portable Network Graphics (PNG). In an example, the system 102 may capture the images in JPEG format. The images when present in the JPEG format are usually of smaller sizes and require less computation for their processing.

After capturing the images, parameters like extrinsic camera parameters and internal calibration matrix related to the images may be determined. The extrinsic camera parameters may comprise a rotation and a translation of the images. In one embodiment, the processor 104 may use the gyroscope 110, the magnetometer 112 and the accelerometer 114 for determining the extrinsic camera parameters related to the images. Thus, the processor 104 may use the gyroscope 110 and the magnetometer 112 for determining the rotation of the images, wherein the gyroscope 110 may determine an angular velocity related to the system 102 and the magnetometer 112 may determine a gravitational component along an axis of the system 102. A parameter (Y) along the y-axis of the system 102 may be determined by the magnetometer 112. Further, a parameter (Z) along the z-axis of the system 102 may be determined by the gyroscope and the accelerometer. Thus, the rotation of the images along the x-axis may be calculated by a cross product of the parameter (Y) and the parameter (Z), as represented using an Equation 4 as mentioned below, $$X = Y \times Z \qquad \text{Equation 4}$$

Here, denotes the cross product of the parameter (Y) and the parameter (Z). Further, the angular velocity related to the system 102 and the gravitational component along the axis of the system 102 may be determined while capturing the images by the image capturing unit 108.

Post determining the rotation of the images, the processor 104 may determine an initial image position. The processor 104 may determine the initial image position using an Equation 5, Equation 6, Equation 7 and Equation 8 as mentioned below, where symbols have their usual meanings, $$v_i = u_i + r_i(a_i - g_i)\Delta t_i \qquad \text{Equation 5}$$

$$s_i = u_i \Delta t_i + 0.5 r_i (a_i - g_i)\Delta t_i^2 \qquad \text{Equation 6}$$

$$u_{i+1} = v_i \qquad \text{Equation 7}$$

$$\Delta t_i = t_{i+1} - t_i \qquad \text{Equation 8}$$

Here, for an $i^{th}$ interval of the acceleration '$u_i$' denotes an initial velocity, $v_i$ denotes a final velocity, '$r_i$' denotes the rotation of the system 102 with respect to real world, '$\Delta t_i$' denotes a time interval between two samples recorded by the accelerometer 114, and '$s_i$' denotes the distance traversed by the system 102 between recording the two samples.

For example, if $c_{ij}$ represents a relative position/initial image position of a $j^{th}$ image from an $i^{th}$ image then $c_{ij}$ may be represented as shown using Equation 9 mentioned below, $$c_j - c_i \approx c_{ij} \qquad \text{Equation 9}$$

Here, '$C_i$' denotes a global position of the $i^{th}$ image with respect to a world coordinate system and '$C_j$' denotes a global position of the $j^{th}$ image with respect to the world coordinate system. An approximation symbol ($\approx$) is used because of the presence of a scale difference between the $i^{th}$ image and the $j^{th}$ image.

Although, the static bias (B) is been eliminated from the acceleration upon calibration of the accelerometer 114, the acceleration may still comprise of different noises. The different noises like a white noise, a residual noise, and a flicker noise may be present in the acceleration due to different environmental and sensor effects like bias instability, temperature, calibration, and velocity random walk. The different noises may result in an error in the initial image position estimated by the processor 104. Thus, an optimization of the initial frame position may be performed for reducing the error associated with the determined initial frame position.

After determining the initial image position, the processor 104 may optimize the initial image position for determining an optimized image position. The processor 104 may represent the Equation 8 into an ideal linear form of equation shown by an Equation 10, as mentioned below, $$Ax=B \quad \text{Equation 10}$$

Here, $A \in \mathbb{R}^{m \times n}$, $B \in \mathbb{R}^m$, $x \in \mathbb{R}^n$, and m, n are positive integers. $\mathbb{R}$ denotes a set of real numbers. The processor 104 may determine an initial estimate of 'x' by using a L1 norm, wherein L1 norm of 'x' for calculating a size/length of 'x' is defined by an Equation 11 as mentioned below, $$\|x\|_1 = \Sigma_{i=1}^n |x_i| \quad \text{Equation 11}$$

However, a noise component 'η' may be present in the ideal linear form of equation (Equation 9) and is represented using an Equation 12 as mentioned below, $$Ax=B+\eta \quad \text{Equation 12}$$

Here, the noise component 'η' may have an unequal variance and may be derived upon modifying the Equation 12. The noise component 'η' may be represented using an Equation 13 as mentioned below, $$\eta = Ax - B \quad \text{Equation 13}$$

The processor 104 may minimize the noise component 'η' by using a iterative reweighed least square technique, as known in the art. The iterative reweighed least square technique may use a Pseudo-Huber loss function $$\left(\frac{x^2}{x^2+\sigma^2}\right).$$

Further, the iterative reweighed least square technique may be initialized using a L1 norm.

Upon determining the optimized image position and the rotation of the images, the processor 104 may determine the translation of the images using an Equation 14 as mentioned below, $$t_{ij} = -R_j c_{ij} \quad \text{Equation 14}$$

Here, $t_{ij}$ denotes the translation of the $j^{th}$ image with respect to the $i^{th}$ image, and $R_j$ denotes the rotation of the $j^{th}$ image.

Thereafter, upon substituting the value of $c_{ij}$ from the Equation 9 into the Equation 14, an Equation 15 is obtained. The Equation 15 defines the translation of the images and is as mentioned below, $$t_{ij} = -R_j(C_j - C_i) \quad \text{Equation 15}$$

Upon determining the translation of the images, the processor 104 may determine an relative rotation of the images using an Equation 16 as mentioned below, $$R_{ij} = R_j R_i^{-1} \quad \text{Equation 16}$$

Here, $R_{ij}$ defines the relative rotation of the $j^{th}$ image with respect to the $i^{th}$ image, $R_j$ defines relative rotation of the $j^{th}$ image, and $R_i$ defines relative rotation of the $i^{th}$ image.

Post determining the extrinsic camera parameters comprising the rotation of the images and the translation of the images, the processor 104 may determine the internal calibration matrix of the images. The internal calibration matrix may comprise a focal length of the image capturing unit 108, and a principle point of the image capturing unit 108. The internal calibration matrix related to each of the images remains the same as the images are being captured from the same image capturing unit 108. Thus, the processor 104 may determine the internal calibration matrix once, using an image from the images. The processor 104 may determine the internal calibration matrix using a Zhang's technique, wherein the internal calibration matrix may be represented as, $$\begin{bmatrix} f & 0 & c_x \\ 0 & f & c_y \\ 0 & 0 & 1 \end{bmatrix} = K$$

Here, 'K' represents the internal calibration matrix, ($c_x$, $c_y$) represent the principle point of the image capturing unit 108, and 'f' denotes the focal length of the image capturing unit 108.

Upon determining the extrinsic camera parameters (rotation of the images and translation of the images), and the internal calibration matrix (K), the processor 104 may determine the fundamental matrix using an Equation 17 as mentioned below, $$F_{ij} = K_j^{-T} [t_{ij}]_* R_j K_i^{-1} \quad \text{Equation 17}$$

Here, $F_{ij}$ represents the fundamental matrix between the $i^{th}$ image and the $j^{th}$ image, $K_i$ represents the internal calibration matrix for the $i^{th}$ image, and $K_j$ represents the internal calibration matrix for the $j^{th}$ image. The fundamental matrix is a matrix of the order 3*3, wherein the fundamental matrix is an algebraic representation of epipolar geometry. The epipolar geometry describes a geometric relationship between the images of the object, wherein the images may be captured by the system 102 from different views/locations.

After determining the fundamental matrix, the processor 104 may extract features of the images using a suitable technique. The features may comprise information like an edge (line segment joining two vertices of an object) of the object, orientation of the edge, corners, ridges, blobs (region of a digital image with known properties), color of a specific region, or any other interest point in the images. The technique for extracting the features of the images may be selected from the group consisting of a Scale Invariant Feature Transform (SIFT), a Speeded Up Robust Features (SURF), a Gradient Location and Orientation Histogram (GLOH), and a Histogram of Oriented Gradients (HOG). In an example, the processor 104 may use a SIFT technique for extracting the features of the images.

Upon extracting the features of the images, the processor 104 may generate point correspondences between the images using the features. The point correspondences refer to determining a portion of a first image that corresponds to a portion of a second image, wherein the second image may be different than the first image. Thus, the point correspondences are indicative of the features common between the images. The differences between the first image and the second image may exist due to change in position of the system 102 while capturing the images, the elapse of time, or movement of the object in the images. Generating the point correspondences leads to establishing relations between the features of the images. In one example, the processor 104 may use an Approximate Nearest Neighbor (ANN) library for matching the features among the images to determine the point correspondences. The ANN library may be stored at the system database 120. The ANN library may include rules for determining a nearest neighbor for the features of the images. A distance between the features of the images may be calculated for determining the nearest neighbor using a distance function. In an example, the distance function may be represented in the form of a Euclidean distance.

Further, the processor 104 may filter the point correspondences using the fundamental matrix for generating the filtered point correspondences. The point correspondences generated by the processor 104 may include true point correspondences/inliers and false point correspondences/outliers. The mismatched point correspondences generated by the processor 104 are identified as the false point correspondences/outliers and remaining point correspondences excluding the outliers are identified as inliers. The processor 104 may block the false point correspondences, using the fundamental matrix, by applying the point correspondences to an Equation 18 as mentioned below, $$x_j^T F_{ij} x_i = 0 \quad \text{Equation 18}$$

Here, '$x_j$' and '$x_i$' are two features of the images that are identified as points of the images. In an example, if the points '$x_j$' and '$x_i$' satisfy the above mentioned Equation 18, then the points are filtered as a true point correspondence pair and are thus identified as filtered point correspondences. But if the points '$x_j$' and '$x_i$' does not satisfy the Equation 18 and $x_j^T F_{ij} x_i$ exceeds a predefined threshold (Th), then the points '$x_j$' and '$x_i$' are identified as false point correspondences and are filtered out.

Post filtering the point correspondences, the processor 104 may process the filtered point correspondences related to the images, for generating the 3D structure. The processor 104 may employ a triangulation technique for generating the 3D points from the filtered point correspondences. At first, the triangulation technique involves projecting the filtered point correspondences for estimating 3D points/3D space points/structure points. Further, the 3D points may be identified as the 3D structure.

The 3D structure may be represented using an Equation 19 as mentioned below, $$x = PX \quad \text{Equation 19}$$

Here, '$x$' represents a point of the images, '$X$' represents an estimated 3D point corresponding to the point '$x$', and '$P$' represents an image capturing unit matrix. The image capturing unit matrix '$P$' comprises the global rotation '$R$' and the global translation '$t$'. Thus, the Equation 19 may be modified to produce an Equation 20 as mentioned below, $$x = K[R|t]X \quad \text{Equation 20}$$

Here, '$K$' represents the internal calibration matrix. Upon substituting '$t$' from the Equation 14 into the Equation 20, an Equation 21 representing the 3D structure is obtained, wherein the Equation 21 is as mentioned below, $$x = K[R|-RC]X \quad \text{Equation 21}$$

Figure 2:
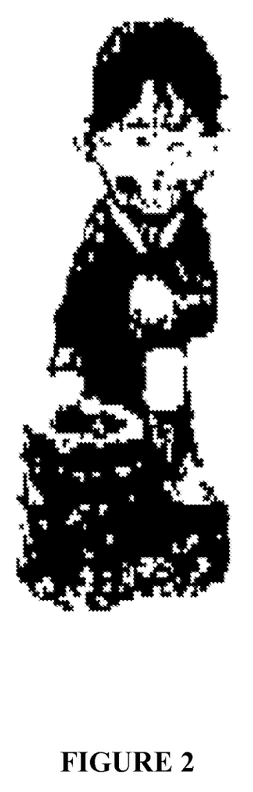
FIG. 2 illustrates an optimized 3D structure, in accordance with an embodiment of the present subject matter.

Post generating the 3D structure, the processor 104 may optimize the 3D structure for generating an optimized 3D structure, as shown in FIG. 2. The processor 104 may optimize the 3D structure by minimizing reprojection errors associated with the 3D points present in the 3D structure. The 3D structure may be optimized using a bundle adjustment technique. In an example, the processor 104 may use a Levenberg-Marquardt technique as the bundle adjustment technique, for optimizing the 3D structure.

In an example, '$n$' 3D points are seen in '$m$' views. '$X_{ij}$' denotes the projection of an $i^{th}$ point on an 'image $j$'. '$v_{ij}$' denotes a binary variable. The value of '$v_{ij}$' is '1' if the '3D point $i$' is visible in the 'image $j$' and the value of '$v_{ij}$' equals to '0' if the '3D point $i$' is not visible in the 'image $j$'. The 'image $j$' is parameterized by a vector '$a_j$' and the each '3D point $i$' is parameterized by a vector '$b_i$'. The bundle optimization technique optimizes the reprojection errors using an Equation 22, as mentioned below, $$\text{Min}_{a_j, b_i} \sum_{i=0}^{n} \sum_{j=1}^{m} v_{ij} d(Q(a_j, b_i), x_{ij})^2 \quad \text{Equation 22}$$

Here, $Q(a_j, b_i)$ denotes predicted projection of the '3D point $i$' on the 'image $j$' and $d(X, Y)$ denotes a Euclidean distance between the image points represented by the vector X and vector Y.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

Figure 3A:
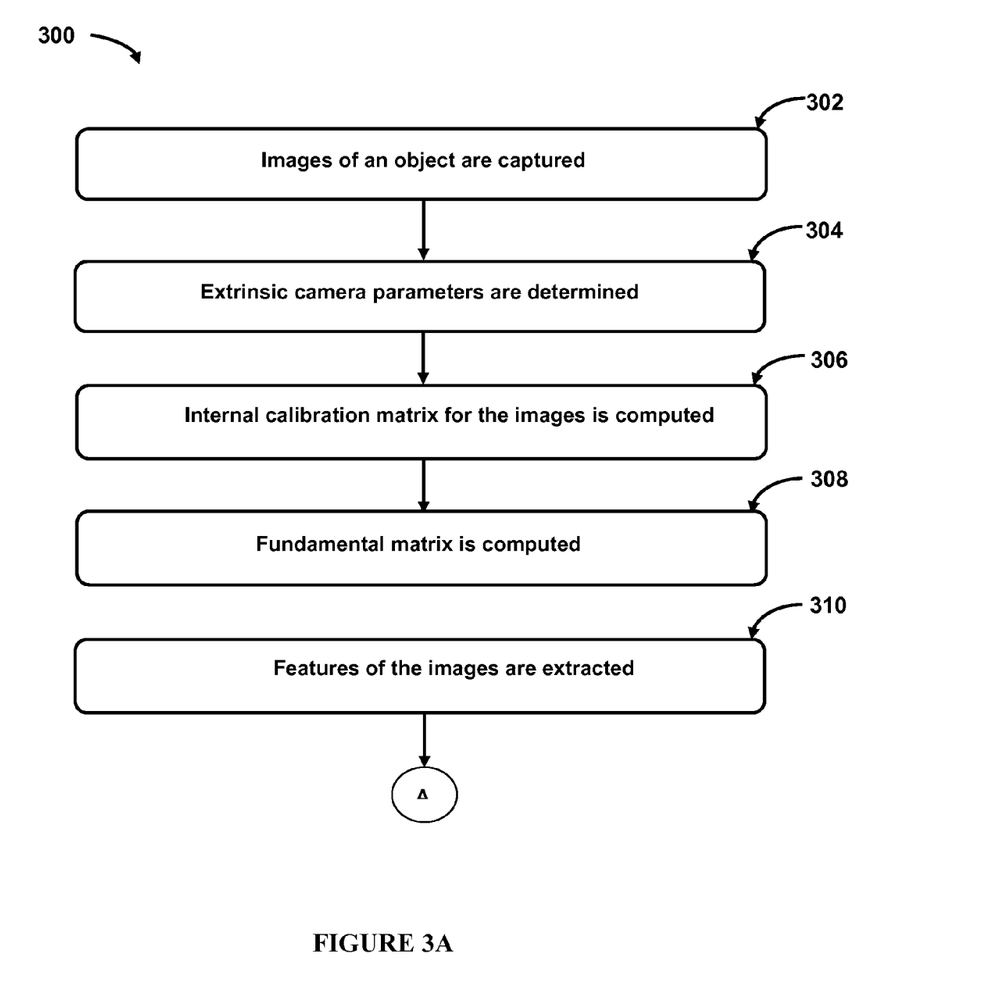
FIG. 3a and FIG. 3b jointly show a flowchart for illustrating a method for constructing a 3D structure, in accordance with an embodiment of the present subject matter.

At block 302, images of an object may be captured by a system 102 comprising an image capturing unit 108. The images may be captured from plurality of viewpoints/locations/viewing angles.

At block 304, extrinsic camera parameters related to the image capturing unit may be determined. The extrinsic camera parameters may comprise a rotation of the images and a translation of the images. In one implementation, the extrinsic camera parameters may be determined by the processor 104.

At block 306, internal calibration matrix for the images may be computed. The internal calibration matrix may comprise a focal length of the image capturing unit, and a principle point of the image capturing unit. In one implementation, the internal calibration matrix may be computed by the processor 104.

At block 308, the fundamental matrix may be computed. The fundamental matrix may be computed using the extrinsic camera parameters and the internal calibration matrix. In one implementation, the fundamental matrix may be computed by the processor 104.

At block 310, the features of the images may be extracted. The features of the images may comprise interest points of the images. In one implementation, the features of the images may be extracted by the processor 104.

Figure 3B:
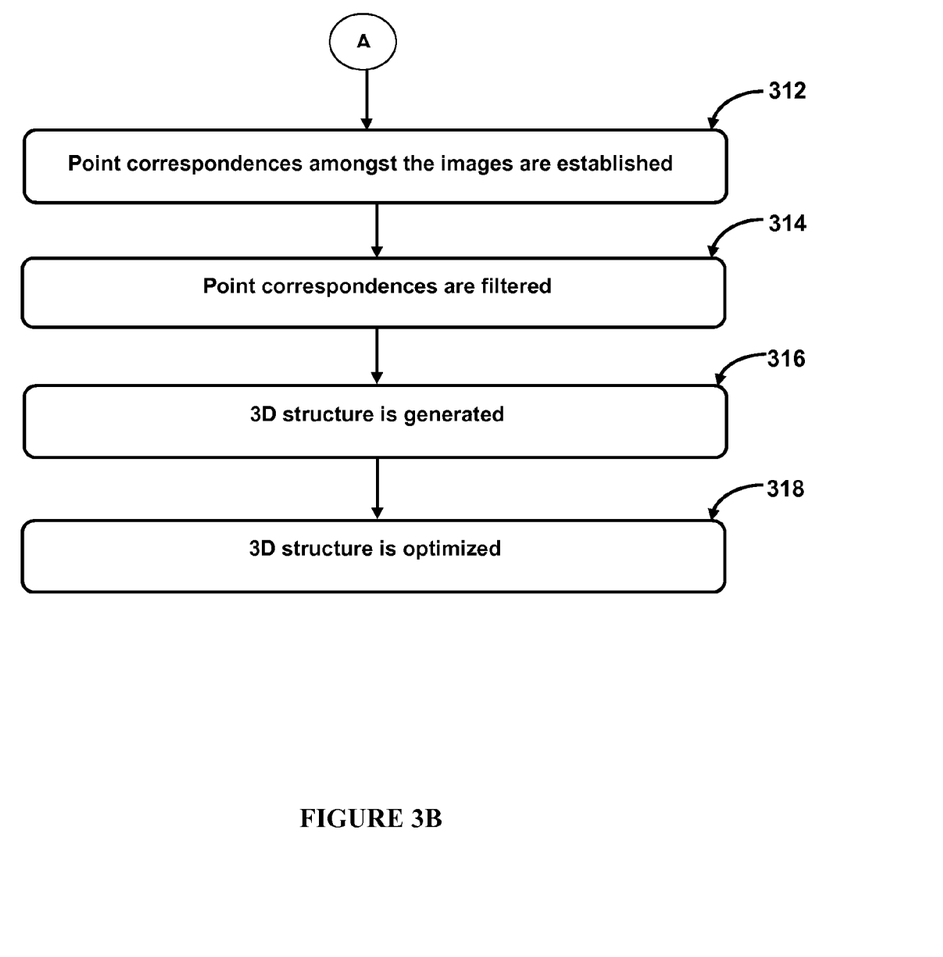

At block 312, the point correspondences amongst the images may be established. The point correspondences amongst the images develop a relation between the features of the images. In one implementation, the point correspondences may be established by the processor 104.

At block 314, the point correspondences may be filtered. The point correspondences may be filtered using the fundamental matrix. The point correspondences may be filtered for removing the false point correspondences and thus generating filtered point correspondences. In one implementation, the point correspondences may be filtered by the processor 104.

At block 316, the 3D structure may be generated. The 3D structure may be generated by projecting the filtered point correspondences using the triangulation technique. In one implementation, the 3D structure may be generated by the processor 104.

At block 318, the 3D structure may be optimized. The 3D structure may be optimized using the bundle adjustment technique. In one implementation, the 3D structure may be optimized by the processor 104.

Although implementations for methods and systems for constructing the 3D structure have been described in language specific to structural features and/or methods, it is to be understood that the appended claims are not necessarily limited to the specific features or methods described. Rather, the specific features and methods are disclosed as examples of implementations for constructing the 3D structure.

We claim:

1. A method for constructing a three-dimensional (3D) structure, the method comprising:
    capturing, by an image capturing unit, images of an object wherein capturing the images comprises capturing a first image when the image capturing unit is stationary at a first position and capturing a second image at a second position during movement of the image capturing unit by a threshold distance in a first direction from the first position;
    determining, by a processor, extrinsic camera parameters, wherein determining the extrinsic parameters comprises:
        determining an angular velocity of the image capturing unit from a gyroscope;
        determining a gravitational component of the image capturing unit from a magnetometer, and
        determining an acceleration of the image capturing unit from an accelerometer while capturing the second image, wherein determining the extrinsic camera parameter further comprises determining a rotation and a translation between the first image and second image wherein determining the rotation comprises:
            determining a first rotation for the first image as a product of the angular velocity along a first axis with the gravitational component along a second axis at the first position, the second axis being perpendicular to the first axis;
            determining a second rotation for the second image as a product of the angular velocity along the first axis with the gravitational component along the second axis at the second position; and
            determining the rotation as a multiplication of one rotation matrix by a transpose of a second rotation matrix;
    wherein determining the translation comprises:
        determining an initial image position of the first image while capturing the image and the initial image position optimized using an iterative reweighed least square technique to generate an optimized image position;
        wherein optimizing the initial image position comprises reducing error associated with the determined initial image position; and
        determining the translation between the first image and the second image using the optimized image position and the rotation, wherein the translation is calculated as a product of the optimized initial position and the rotation between the first image and the second image;
    computing, by the processor, an internal calibration matrix for the images, wherein the internal calibration matrix comprises a focal length of the image capturing unit and a principle point of the image capturing unit;
    computing, by the processor, a fundamental matrix using the extrinsic camera parameters and the internal calibration matrix;
    extracting, by the processor, features of the images;
    establishing, by the processor, point correspondences amongst the images, wherein the point correspondences are established using the features of the images;
    filtering, by the processor, the point correspondences using the fundamental matrix to generate filtered point correspondences; and
    generating, by the processor, a 3D structure using the filtered point correspondences, wherein the 3D structure is generated using a triangulation technique.

2. The method of claim 1, wherein the features of the images are extracted using a technique selected from a group consisting of Scale Invariant Feature Transform (SIFT), Speeded Up Robust Features (SURF), Gradient Location and Orientation Histogram (GLOH), and Histogram of Oriented Gradients (HOG).

3. The method of claim 1, further comprising optimizing the 3D structure for minimizing re-projection errors associated with the 3D structure, wherein the 3D structure may be optimized using a bundle adjustment technique.

4. A system for constructing a 3D structure, the system comprising:
    an image capturing unit for capturing images of an object wherein capturing the images comprises capturing a first image when the image capturing unit is stationary at a first position and capturing a second image at a second position during movement of the image capturing unit by a threshold distance in a first direction from the first position;
    a processor;
    a memory coupled to the processor, wherein the processor is configured for executing programmed instructions stored in the memory to:
        determine extrinsic camera parameters, wherein the processor configured to determine the extrinsic camera parameters further comprises the processor configured to:
            determine an angular velocity of the image capturing unit from a gyroscope;
            determine a gravitational component of the image capturing unit from a magnetometer;
            determine an acceleration of the image capturing unit from an accelerometer while capturing the image, wherein the processor configured to determine the extrinsic camera parameters further comprises the processor configured to determine a rotation and a translation between the first image and second image, and wherein the processor configured to determine the rotation comprises the processor being configured to:
                determine a first rotation for the first image as a product of the angular velocity along a first axis with the gravitational component along a second axis at the first position, the second axis being perpendicular to the first axis;
                determine a second rotation for the second image as a product of the angular velocity along the first axis with the gravitational component along the second axis at the second position; and
                determine the rotation as a multiplication of one rotation matrix by a transpose of a second rotation matrix;
            wherein the processor configured to determine the translation comprises the processor configured to:
                determine an initial image position of the first image while capturing the image and the initial image position optimized using an iterative reweiqhed least square technique to generate an optimized image position;

wherein the optimization of the initial image position reduces error associated with the determined initial image position caused by presence of different noises including a white noise, a residual noise and a flicker noise present in the acceleration; and determine the translation between the first image and the second image using the optimized image position and the rotation, wherein the translation is calculated as a product of the optimized initial position and the rotation between the first image and the second image;

compute an internal calibration matrix for the images, wherein the internal calibration matrix comprises a focal length of the image capturing unit and a principle point of the image capturing unit;

compute a fundamental matrix using the extrinsic camera parameters and the internal calibration matrix;

extract features of the images;

establish point correspondences amongst the images, wherein the point correspondences are established using the features of the images;

filter the point correspondences using the fundamental matrix to generate filtered point correspondences; and generate a 3D structure using the filtered point correspondences, wherein the 3D structure is generated using a triangulation technique.

5. The system of claim 4, wherein the processor further optimizes the 3D structure, and wherein optimizing the 3D structure minimizes reprojection errors associated with the 3D structure, and wherein the 3D structure may be optimized using a bundle adjustment technique.

6. A non-transitory computer readable medium embodying a program executable in a computing device for constructing a 3D structure, the program comprising:

a program code for capturing, by an image capturing unit, images of an object wherein capturing the images comprises capturing a first image when the image capturing unit is stationary at a first position and capturing a second image at a second position during movement of the image capturing unit by a threshold distance in a first direction from the first position;

a program code for determining extrinsic camera parameters, wherein determining the extrinsic parameters comprises:

determining an angular velocity of the image capturing unit from a gyroscope;

determining a gravitational component of the image capturing unit from a magnetometer, determining an acceleration of the image capturing unit from an accelerometer while capturing the image, wherein determining the extrinsic camera parameter further comprises determining a rotation and a translation between the first image and second image wherein determining the rotation comprises:

determining a first rotation for the first image as a product of the angular velocity along a first axis with the gravitational component along a second axis at the first position, the second axis being perpendicular to the first axis;

determining a second rotation for the second image as a product of the angular velocity along the first axis with the gravitational component along the second axis at the second position; and determining the rotation as a multiplication of one rotation matrix by a transpose of a second rotation matrix;

wherein determining the translation comprises:

determining an initial image position of the first image while capturing the image and the initial image position optimized using an iterative reweiqhed least square technique to generate an optimized image position;

wherein optimizing the initial image position comprises reducing error associated with the determined initial image position caused by presence of different noises including a white noise, a residual noise and a flicker noise present in the acceleration; and determining the translation between the first image and the second image using the optimized image position and the rotation, wherein the translation is calculated as a product of the optimized initial position and the rotation between the first image and the second image;

a program code for computing an internal calibration matrix for the images, wherein the internal calibration matrix comprises a focal length of the image capturing unit and a principle point of the image capturing unit;

a program code for computing a fundamental matrix using the extrinsic camera parameters and the internal calibration matrix;

a program code for extracting features of the images;

a program code for establishing point correspondences amongst the images, wherein the point correspondences are established using the features of the images;

a program code for filtering the point correspondences using the fundamental matrix to generate filtered point correspondences; and a program code for generating a 3D structure using the filtered point correspondences, wherein the 3D structure is generated using a triangulation technique.

7. The method of claim 1, wherein the threshold distance is in a range of 1 mm to 254 mm.

8. The method of claim 1, wherein the different noises present in the acceleration are due to environmental and sensor effects comprising at least one of the following: bias instability, temperature, calibration and velocity random walk.

9. The system of claim 4, wherein the different noises present in the acceleration are due to environmental and sensor effects comprising at least one of the following: bias instability, temperature, calibration and velocity random walk.

* * * * *